(12) United States Patent
Du et al.

(10) Patent No.: US 10,797,521 B2
(45) Date of Patent: Oct. 6, 2020

(54) CONTROL CIRCUIT AND CONTROL METHOD FOR WIRELESS POWER TRANSMISSION DEVICE

(71) Applicant: Delta Electronics (Thailand) Public Company Limited, Samutprakarn (TH)

(72) Inventors: Shuailin Du, Samutprakarn (TH); Yongkai Liao, Samutprakarn (TH)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 218 days.

(21) Appl. No.: 16/045,202

(22) Filed: Jul. 25, 2018

(65) Prior Publication Data

US 2019/0058357 A1 Feb. 21, 2019

(30) Foreign Application Priority Data

Aug. 15, 2017 (CN) .......................... 2017 1 0766978

(51) Int. Cl.
*H02J 50/12* (2016.01)
*H04B 5/00* (2006.01)
*H02J 50/70* (2016.01)
*H02J 50/80* (2016.01)
*H02J 50/00* (2016.01)

(52) U.S. Cl.
CPC .............. *H02J 50/12* (2016.02); *H02J 50/00* (2016.02); *H02J 50/70* (2016.02); *H02J 50/80* (2016.02); *H04B 5/0037* (2013.01); *H04B 5/0075* (2013.01)

(58) Field of Classification Search
CPC .. H02J 50/12; H02J 50/80; H02J 50/00; H02J 50/70; H04B 5/0037; H04B 5/0075
USPC ........................................................ 307/104
See application file for complete search history.

(56) References Cited

U.S. PATENT DOCUMENTS

| | | | |
|---|---|---|---|
| 8,410,637 B2 | 4/2013 | Karaoguz et al. | |
| 9,065,302 B2 | 6/2015 | Kamata et al. | |
| 9,088,167 B2 | 7/2015 | Kim et al. | |
| 9,496,083 B2 | 11/2016 | Lee et al. | |
| 9,496,718 B2 | 11/2016 | Kim et al. | |
| 9,502,923 B2 * | 11/2016 | Kim ........................ | H02J 7/025 |

(Continued)

FOREIGN PATENT DOCUMENTS

| | | |
|---|---|---|
| CN | 104377839 A | 2/2015 |
| CN | 105703643 A | 6/2016 |

(Continued)

*Primary Examiner* — Michael R. Fin
(74) *Attorney, Agent, or Firm* — Kirton McConkie; Evan R. Witt

(57) ABSTRACT

A control circuit for a wireless power transmission device is provided. The wireless power transmission device includes a transmitter unit and a receiver unit. The control circuit includes a transmitter detecting unit, a first control unit and a driver unit. The transmitter detecting unit obtains an input power of the transmitter unit and generates an input power signal. The first control unit generates a control signal according to a result of comparing the input power signal with a reference input power signal. The driver unit drives switching devices of the transmitter unit according to the control signal. Consequently, the input power of the transmitter unit is adjusted, and an output ripple or a magnitude of the output of the receiver unit is adjusted.

34 Claims, 11 Drawing Sheets

(56) References Cited

U.S. PATENT DOCUMENTS

| | | |
|---|---|---|
| 2015/0270721 A1 | 9/2015 | Lin et al. |
| 2016/0141882 A1* | 5/2016 | Ichikawa ................ H02J 5/005 |
| | | 307/104 |
| 2016/0352152 A1 | 12/2016 | Karalis et al. |
| 2016/0355095 A1 | 12/2016 | Okamoto |
| 2016/0372956 A1 | 12/2016 | Jung et al. |
| 2018/0241301 A1* | 8/2018 | Nagaoka ................ B60L 53/12 |

FOREIGN PATENT DOCUMENTS

| | | |
|---|---|---|
| EP | 2763279 A1 | 8/2014 |
| EP | 3051690 A1 | 8/2016 |

* cited by examiner

CONTROL CIRCUIT AND CONTROL METHOD FOR WIRELESS POWER TRANSMISSION DEVICE

CROSS-REFERENCE TO RELATED APPLICATION

This application claims priority to China Patent Application No. 201710766978.2, filed on Aug. 15, 2017, the entire content of which is incorporated herein by reference for all purposes.

FIELD OF THE INVENTION

The present invention relates to a control circuit and a control method, and more particularly to a control circuit and a control method for a wireless power transmission device.

BACKGROUND OF THE INVENTION

With increasing development and progress of science and technology, the wireless power transmission technology including a wireless power transmission part become more and more popular in various applications. The wireless power transmission part comprises a transmitter unit and a receiver unit, which are spatially separated with each other, so the wireless power transmission technology can provide more reliable, more convenient, safer and more automatic power supplying performance compared with the conventional wired power supply. It is an important issue of controlling output characteristics of the wireless power transmission device, and output ripple is one of them.

Generally, there are three approaches of eliminating the output ripple in the wireless power transmission device. In accordance with a first approach, a filter circuit comprising a capacitor and/or an inductor is located at a transmitting side of the wireless power transmission device to reduce the ripple of the input power. Consequently, the output ripple is reduced. In accordance with a second approach, a filter circuit comprising a capacitor and/or an inductor is located at a receiving side of the wireless power transmission device to reduce the output ripple. In accordance with a third approach, an adjusting circuit is connected with output terminals of the wireless power transmission device to control the output performance. Consequently, the output ripple is reduced.

However, the above three approaches still have some drawbacks. For example, since additional electronic components are installed in the wireless power transmission device, so that the volume and power loss of the wireless power transmission device increase and the efficiency of the wireless power transmission device decreases.

Therefore, there is a need of providing a control circuit and a control method for a wireless power transmission device in order to overcome the above drawbacks.

SUMMARY OF THE INVENTION

The present disclosure provides a control circuit and a control method for a wireless power transmission device. In order to reduce the output ripple or changing the output magnitude, it is not necessary to install additional and big electronic components in the wireless power transmission device according to the technology of the present disclosure. Consequently, the volume and power loss of the wireless power transmission device doesn't increase and the efficiency of the wireless power transmission device is improved.

In accordance with an aspect of the present disclosure, there is provided a control circuit for a wireless power transmission device. The wireless power transmission device includes a transmitter unit and a receiver unit. The control circuit includes a transmitter detecting unit, a first control unit and a driver unit. The transmitter detecting unit obtains an input power of the transmitter unit and generates an input power signal. The first control unit generates a control signal according to a result of comparing the input power signal with a reference input power signal. The driver unit drives switching devices of the transmitter unit according to the control signal. Consequently, the input power of the transmitter unit is adjusted, and then an output ripple or a magnitude of an output of the receiver unit is adjusted.

In accordance with another aspect of the present disclosure, there is provided a control method for a wireless power transmission device. The wireless power transmission device includes a transmitter unit and a receiver unit. The control method includes the following steps. Firstly, the transmitter detecting unit obtains an input power of the transmitter unit, and generates an input power signal. Then, a first control unit generates a control signal according to a result of comparing the input power signal with a reference input power signal. Then, the driver unit drives switching devices of the transmitter unit according to the control signal. Consequently, the input power of the transmitter unit is adjusted, and an output ripple or a magnitude of the output of the receiver unit is adjusted.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
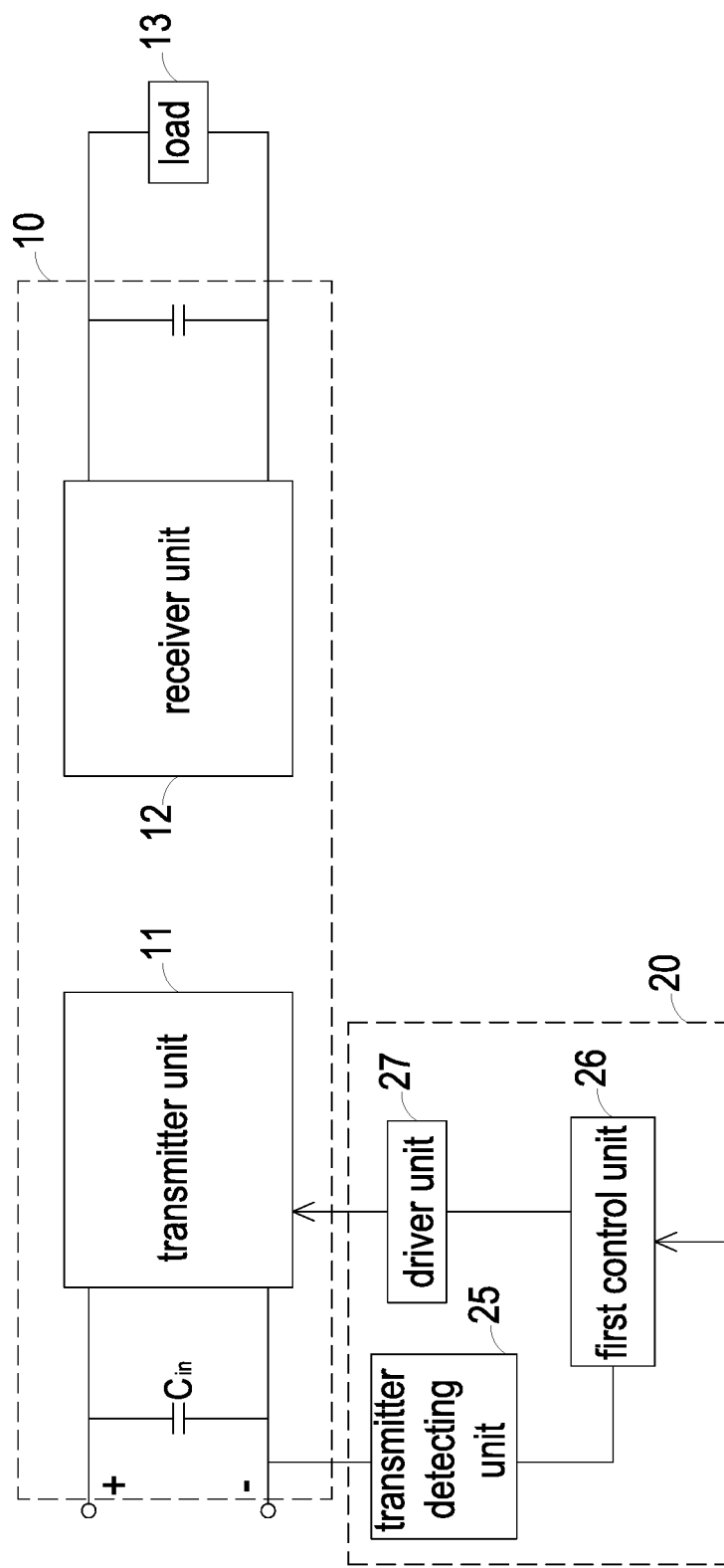
FIG. 1 is a schematic circuit diagram illustrating a wireless power transmission device and a control circuit for the wireless power transmission device according to a first embodiment of the present disclosure.

FIG. 1 is a schematic circuit diagram illustrating a wireless power transmission device and a control circuit for the wireless power transmission device according to a first embodiment of the present disclosure. As shown in FIG. 1, the wireless power transmission device 10 comprises a transmitter unit 11 and a receiver unit 12. The transmitter unit 11 is used for receiving an input DC power and converting the input DC power into an AC power, and the AC power is transmitted from the transmitter unit 11. The receiver unit 12 receives the AC power from the transmitter unit through an electromagnetic coupling effect and converts the AC power into an output DC power so as to provide the electric power to a load 13. The control circuit 20 is used for controlling the wireless power transmission device 10. In this embodiment, the control circuit 20 comprises a transmitter detecting unit 25, a first control unit 26 and a driver unit 27.

The transmitter detecting unit 25 is electrically connected with input terminals of the transmitter unit 11. The transmitter detecting unit 25 is used for acquiring the input power of the transmitter unit 11 and generating an input power signal. For example, the transmitter detecting unit 25 detects the voltage and the current that are received by the transmitter unit 11, or detects the voltage and the current inside the transmitter unit 11. Based on the voltage and the current, the transmitter detecting unit 25 obtains the input power and generates the corresponding input power signal.

The first control unit 26 is electrically connected with the transmitter detecting unit 25 for receiving the input power signal from the transmitter detecting unit 25. The first control unit 26 also receives a reference input power signal. According to the result of comparing the reference input power signal with the input power signal, the first control unit 26 generates a control signal. For example, the reference input signal is read from a memory (not shown) of the transmitter unit 11 or acquired from a host computer (not shown). Alternatively, the reference input power signal is acquired based on the detected output of the receiver unit 12. It is noted that the source of the reference input power signal is not restricted.

The driver unit 27 is electrically connected with the first control unit 26 and the transmitter unit 11. The driver unit 27 receives the control signal from the first control unit 26. According to the control signal, the driver unit 27 generates a driver signal and drives the switching devices of the transmitter unit 11 so as to adjust the working state of the transmitter unit 11. Consequently, the input power of the transmitter unit 11 is adjusted. In such way, the output ripple of the receiver unit 12 or the magnitude of the output of the receiver unit 12 is adjusted. It is noted that the number of the switching devices of the transmitter unit 11 is decided according to the actual circuit topology. The number of the driver signals generated by the driver unit 27 is corresponding to the number of the switching devices, and each driver signal drives the corresponding switching devices. In an embodiment, the output of the receiver unit is an output current, an output voltage or an output power. Moreover, the output power may be calculated according to the output voltage and the output current. In an embodiment, the output ripple includes an output voltage ripple, an output current ripple or an output power ripple.

If the first control unit 26 judges that the input power signal is higher than the reference input power signal, the first control unit 26 generates the control signal with an increased switching frequency, a decreased duty cycle or an increased shifted phase angle. Whereas, if the first control unit 26 judges that the input power signal is lower than the reference input power signal, the first control unit 26 generates the control signal with a decreased switching frequency, an increased duty cycle or a decreased shifted phase angle. In addition to the switching frequency, the duty cycle or the shifted phase angle of the control signal, any other appropriate parameters that can be used to adjust the input power may be adjusted according to the result of comparing the reference input power signal with the input power signal. Moreover, the adjusting principle of the control signal is not restricted. In other words, the adjusting principle of the control signal is determined by the detail circuit and the circuit working area. According to the control signal, the driver unit 27 generates the driver signal and drives the switching devices of the transmitter unit 11 to adjust the input power of the transmitter unit 11. Consequently, by adjusting the input power of the transmitter unit 11, the output ripple or the magnitude of the output of the receiver unit 12 is correspondingly adjusted.

As mentioned above, the output dynamic performance and the output steady-state performance of the receiver unit 12 can be adjusted through adjusting the dynamic performance and the steady-state performance of the input power of the transmitter unit 11.

Figure 2B:
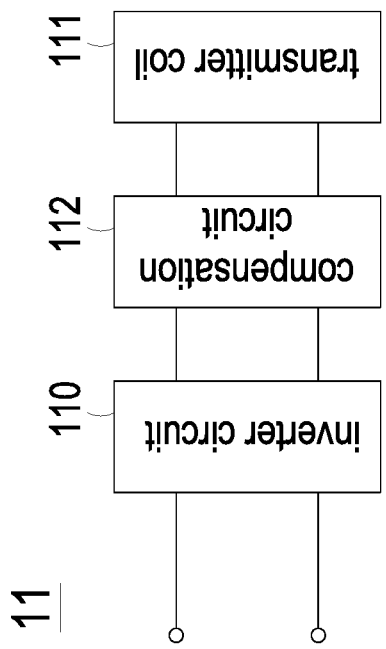
FIG. 2B is a schematic circuit diagram illustrating a variant example of the transmitter unit as shown in FIG. 2A.
Figure 2D:
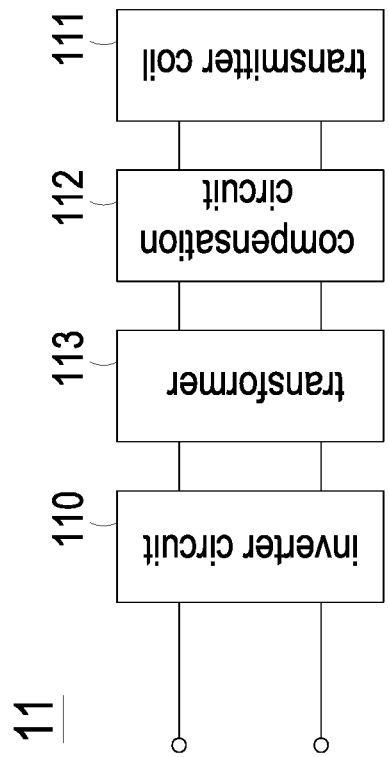
FIG. 2D is a schematic circuit diagram illustrating another variant example of the transmitter unit as shown in FIG. 2A.
Figure 2A:
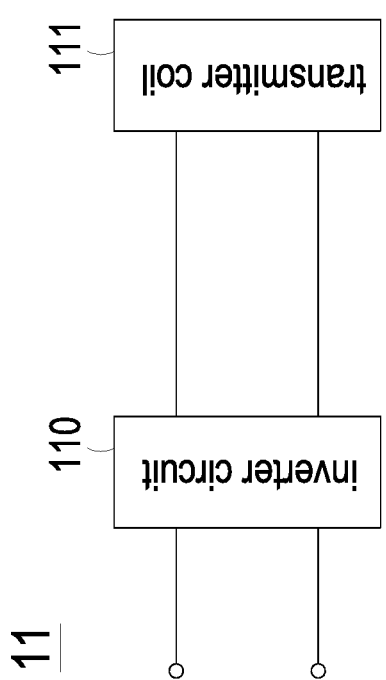
FIG. 2A is a schematic circuit diagram illustrating the transmitter unit of the wireless power transmission device as shown in FIG. 1.

FIG. 2A is a schematic circuit diagram illustrating the transmitter unit of the wireless power transmission device as shown in FIG. 1. As shown in FIG. 2A, the transmitter unit 11 comprises an inverter circuit 110 and a transmitter coil 111. The output terminals of the inverter circuit 110 are connected with the transmitter coil 111. The inverter circuit 110 receives an input DC power. Moreover, the inverter circuit 110 comprises the switching device(s) (not shown). The switching devices are driven by the driver unit 27 according to the control signal from the first control unit 26.

The inverter circuit 110 converts the input DC power into an AC power, and the AC power is transmitted from the transmitter coil 111.

FIG. 2B is a schematic circuit diagram illustrating a variant example of the transmitter unit as shown in FIG. 2A. As shown in FIG. 2B, the transmitter unit 11 comprises an inverter circuit 110, a compensation circuit 112 and a transmitter coil 111. The output terminals of the inverter circuit 110 are connected with the input terminals of the compensation circuit 112. The output terminals of the compensation circuit 112 are connected with the transmitter coil 111. The compensation circuit 112 is used for compensating the reactive power of the transmitter coil 111 to reduce the capacity of the AC power, so that the power transmission efficiency is enhanced.

Figure 2C:
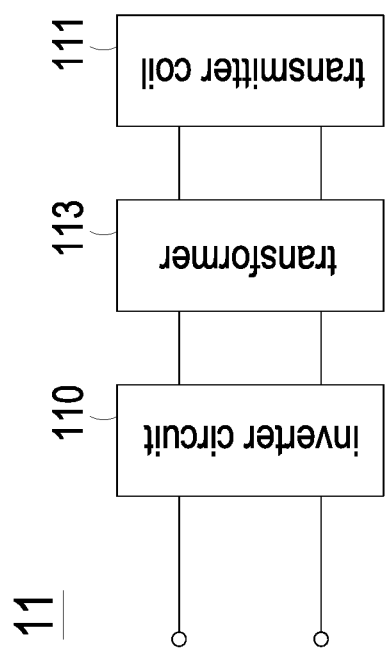
FIG. 2C is a schematic circuit diagram illustrating another variant example of the transmitter unit as shown in FIG. 2A.

FIG. 2C is a schematic circuit diagram illustrating another variant example of the transmitter unit as shown in FIG. 2A. As shown in FIG. 2C, the transmitter unit 11 comprises an inverter circuit 110, a transformer 113 and a transmitter coil 111. The output terminals of the inverter circuit 110 are connected with the primary winding of the transformer 113. The secondary winding of the transformer 113 is connected with the transmitter coil 111. The transformer 113 is used for transforming the voltage level of the AC power.

FIG. 2D is a schematic circuit diagram illustrating another variant example of the transmitter unit as shown in FIG. 2A. As shown in FIG. 2D, the transmitter unit 11 comprises an inverter circuit 110, a compensation circuit 112, a transformer 113 and a transmitter coil 111. The output terminals of the inverter circuit 110 are connected with the primary winding of the transformer 113. The secondary winding of the transformer 113 is connected with the input terminals of the compensation circuit 112. The output terminals of the compensation circuit 112 are connected with the transmitter coil 111. Component parts and elements are designated by identical numeral references, and detailed descriptions thereof are omitted.

Please refer to FIG. 1 and FIGS. 2A, 2B, 2C and 2D. According to the control signal, the driver unit 27 generates the driver signal and drives the switching devices of the inverter circuit 110. If the input power signal is higher than the reference input power signal, the driver unit 27 generates the driver signal and drives the switching devices of the inverter circuit 110 according to the control signal, making the input power of the transmitter unit 11 decreased. Whereas, if the input power signal is lower than the reference input power signal, the driver unit 27 generates the driver signal and drives the switching devices of the inverter circuit 110 according to the control signal, making the input power of the transmitter unit 11 increased.

Figure 3A:
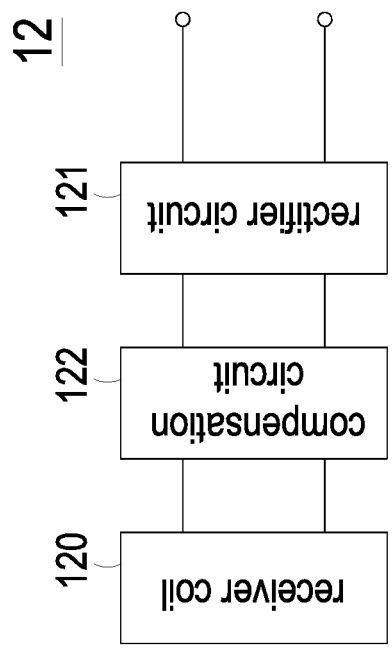
FIG. 3A is a schematic circuit diagram illustrating the receiver unit of the wireless power transmission device as shown in FIG. 1.

FIG. 3A is a schematic circuit diagram illustrating the receiver unit of the wireless power transmission device as shown in FIG. 1. As shown in FIG. 3A, the receiver unit 12 comprises a receiver coil 120 and a rectifier circuit 121. The receiver coil 120 is connected with the input terminals of the rectifier circuit 121. The receiver coil 120 receives the AC power from the transmitter coil 111. In this embodiment, the AC power can be transmitted from the transmitter coil 111 to the receiver coil 120 through an electromagnetic coupling effect. In some other embodiments, the AC power also can be transmitted from the transmitter coil 111 to the receiver coil 120 through a resonance effect. The rectifier circuit 121 is used for converting the AC power into an output DC power.

Figure 3B:
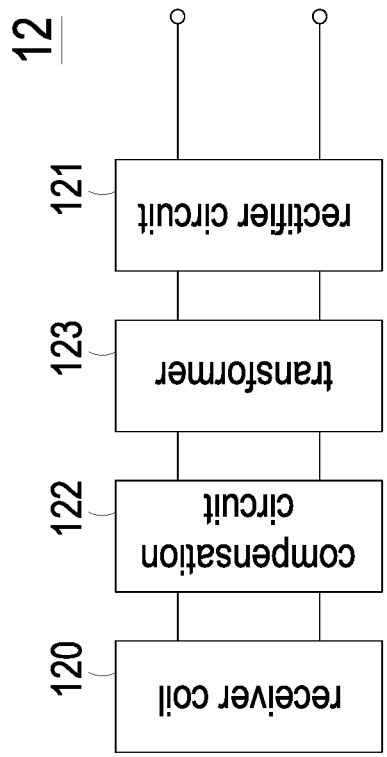
FIG. 3B is a schematic circuit diagram illustrating a variant example of the receiver unit as shown in FIG. 3A.

FIG. 3B is a schematic circuit diagram illustrating a variant example of the receiver unit as shown in FIG. 3A. As shown in FIG. 3B, the receiver unit 12 comprises a receiver coil 120, a compensation circuit 122 and a rectifier circuit 121. The receiver coil 120 is connected with the input terminals of the compensation circuit 122. The output terminals of the compensation circuit 122 are connected with the input terminals of the rectifier circuit 121. The compensation circuit 122 is used for compensating the reactive power of the receiver coil 120 to reduce the capacity of the AC power, so that the power transmission efficiency is enhanced.

Figure 3C:
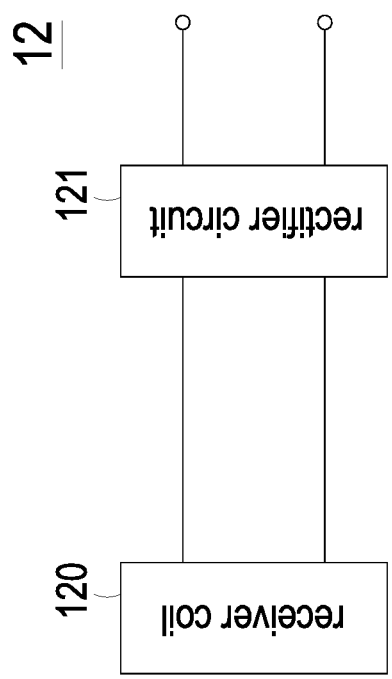
FIG. 3C is a schematic circuit diagram illustrating another variant example of the receiver unit as shown in FIG. 3A.

FIG. 3C is a schematic circuit diagram illustrating another variant example of the receiver unit as shown in FIG. 3A. As shown in FIG. 3C, the receiver unit 12 comprises a receiver coil 120, a transformer 123 and a rectifier circuit 121. The receiver coil 120 is connected with the primary winding of the transformer 123. The secondary winding of the transformer 123 is connected with the input terminals of the rectifier circuit 121. The transformer 123 is used for transforming the voltage level of the AC power.

Figure 3D:
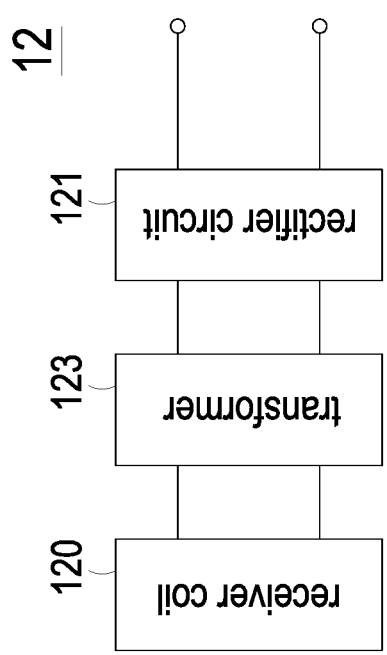
FIG. 3D is a schematic circuit diagram illustrating another variant example of the receiver unit as shown in FIG. 3A.

FIG. 3D is a schematic circuit diagram illustrating another variant example of the receiver unit as shown in FIG. 3A. As shown in FIG. 3D, the receiver unit 12 comprises a receiver coil 120, a compensation circuit 122, a transformer 123 and a rectifier circuit 121. The receiver coil 120 is connected with the input terminals of the compensation circuit 122. The output terminals of the compensation circuit 122 are connected with the primary winding of the transformer 123. The secondary winding of the transformer 123 is connected with the input terminals of the rectifier circuit 121. Component parts and elements are designated by identical numeral references, and detailed descriptions thereof are omitted.

Figure 4B:
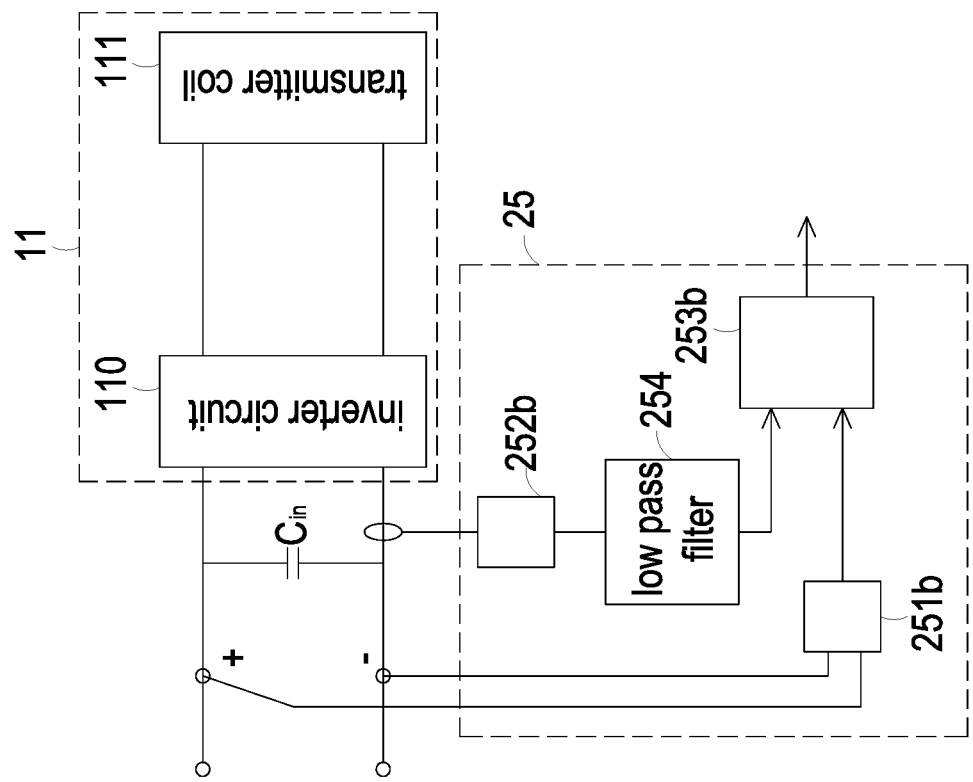
FIG. 4B is a schematic circuit diagram illustrating a variant example of FIG. 4A.
Figure 4A:
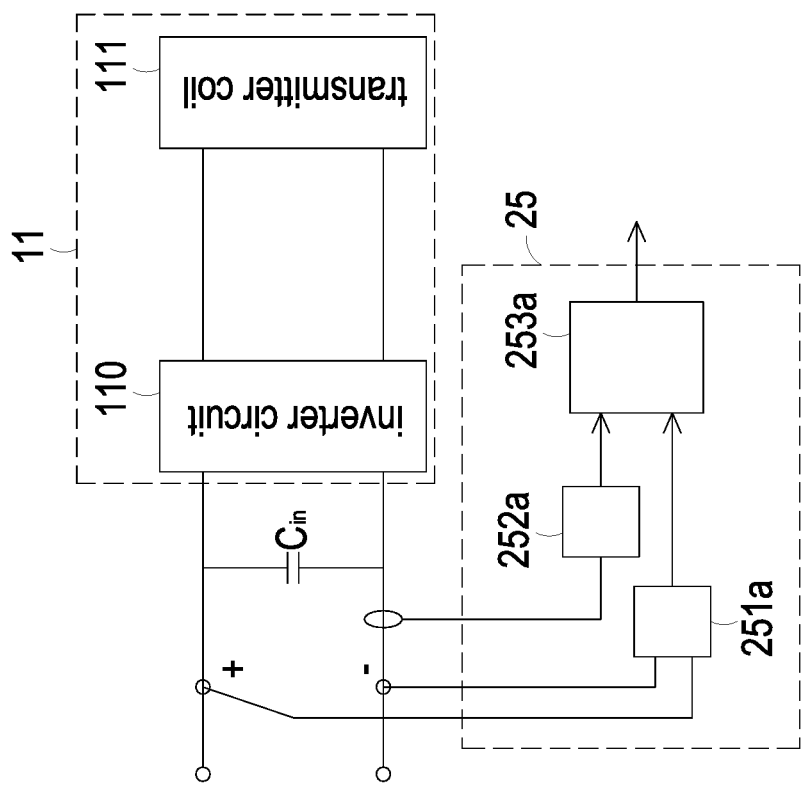
FIG. 4A is a schematic circuit diagram illustrating the relationship between the transmitter detecting unit and the transmitter unit of the wireless power transmission device of FIG. 1.

FIG. 4A is a schematic circuit diagram illustrating the relationship between the transmitter detecting unit and the transmitter unit of the wireless power transmission device of FIG. 1. As shown in FIG. 4A, the transmitter unit 11 comprises the inverter circuit 110 and the transmitter coil 111. Moreover, the wireless power transmission device 10 further comprises an input capacitor $C_{in}$. The input capacitor $C_{in}$ is connected with the input terminals of the inverter circuit 110 in parallel. The input capacitor $C_{in}$ is used to filter the input current of the transmitter unit 11. Moreover, the transmitter detecting unit 25 comprises a voltage detecting circuit 251a, a current detecting circuit 252a and a multiplier 253a. The voltage detecting circuit 251a and the current detecting circuit 252a are connected with the input terminals of the input capacitor $C_{in}$. The voltage detecting circuit 251a is used for detecting the voltage at the input terminals of the input capacitor Cin. That is, the voltage detecting circuit 251a is used for detecting the voltage of the input DC power received by the transmitter unit 11. The current detecting circuit 252a is used for detecting the current to the input terminals of the input capacitor $C_{in}$. That is, the current detecting circuit 252a is used for detecting the current of the input DC power received by the transmitter unit 11. The multiplier 253a is connected with the voltage detecting circuit 251a and the current detecting circuit 252a. According to the voltage of the input DC power and the current of the input DC power, the multiplier 253a obtains the input power of the transmitter unit 11 and generates the input power signal according to the input power.

FIG. 4B is a schematic circuit diagram illustrating a variant example of FIG. 4A. Component parts and elements corresponding to those of FIG. 4A are designated by identical numeral references, and detailed descriptions thereof are omitted. As shown in FIG. 4B, the transmitter detecting unit 25 comprises a voltage detecting circuit 251b, a current detecting circuit 252b, a multiplier 253b and a low pass filter 254. The voltage detecting circuit 251b is connected with the input terminals of the input capacitor $C_{in}$ for detecting the voltage at the input terminals of the input capacitor $C_{in}$. The current detecting circuit 252b is connected with the input terminals of the inverter circuit 110. That is, the current detecting circuit 252a is connected with the output terminals of the input capacitor $C_{in}$. The current detecting circuit 252b is used for detecting the current to the input terminals of the inverter circuit 110. The low pass filter 254 is connected with the current detecting circuit 252b for filtering the current received by the inverter circuit 110. Consequently, the switching harmonic current contained in the current received by the inverter circuit 110 is filtered out. The multiplier 253b is connected with the voltage detecting circuit 251b and the low pass filter 254. According to the voltage at the input terminals of the input capacitor $C_{in}$ and the filtered current from the low pass filter 254, the multiplier 253b obtains the input power of the transmitter unit 11 and generates the input power signal according to the input power.

Figure 4C:
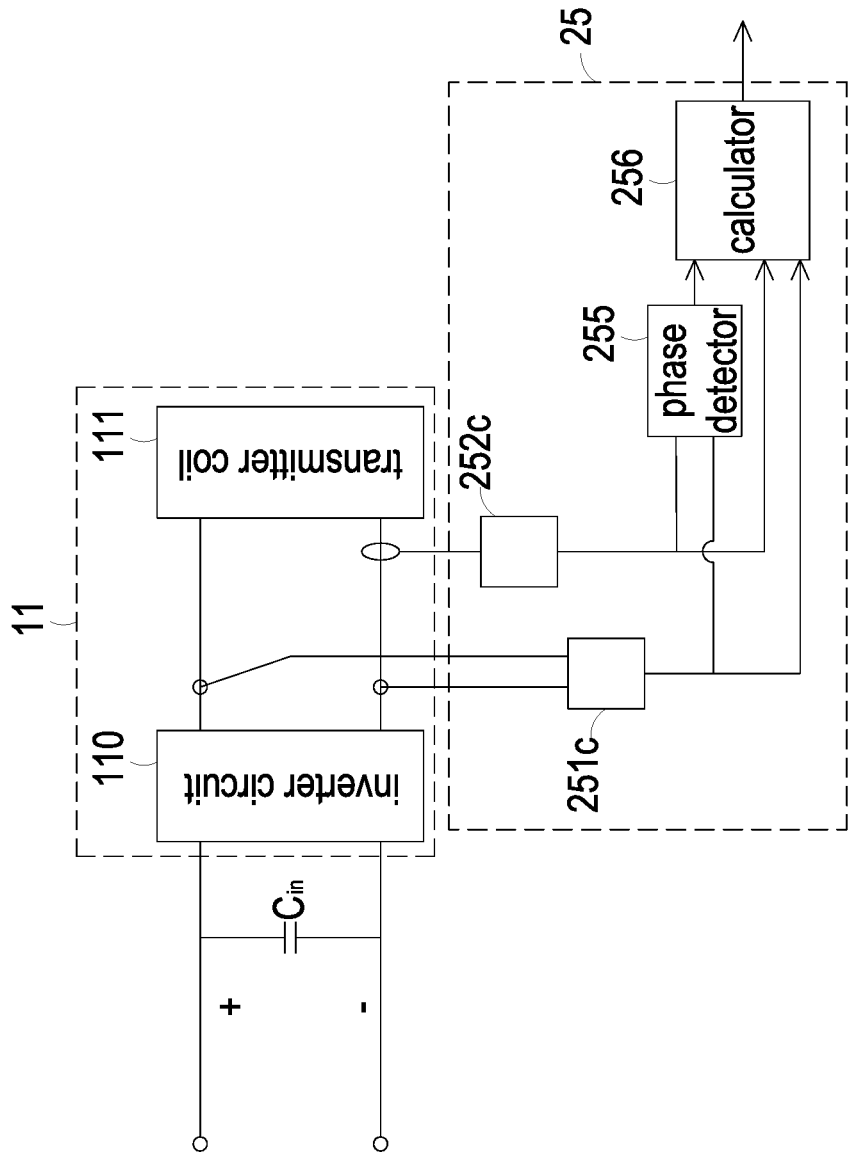
FIG. 4C is a schematic circuit diagram illustrating another variant example of FIG. 4A.

FIG. 4C is a schematic circuit diagram illustrating another variant example of FIG. 4A. Component parts and elements corresponding to those of FIG. 4A are designated by identical numeral references, and detailed descriptions thereof are omitted. As shown in FIG. 4C, the transmitter detecting unit 25 comprises a voltage detecting circuit 251c, a current detecting circuit 252c, a phase detector 255 and a calculator 256. The voltage detecting circuit 251c and the current detecting circuit 252c are connected with the output terminals of the inverter circuit 110 in order to detect the voltage of the AC power and the current of the AC power, respectively. The phase detector 255 is connected with the voltage detecting circuit 251c and the current detecting circuit 252c. According to the voltage of the AC power and the current of the AC power, the phase detector 255 obtains a phase difference between the voltage of the AC power and the current of the AC power. The calculator 256 is connected with the voltage detecting circuit 251c, the current detecting circuit 252c and the phase detector 255. According to the voltage of the AC power, the current of the AC power and the phase difference, the calculator 256 obtains the input power of the transmitter unit 11 and generates the input power signal according to the input power.

Figure 5:
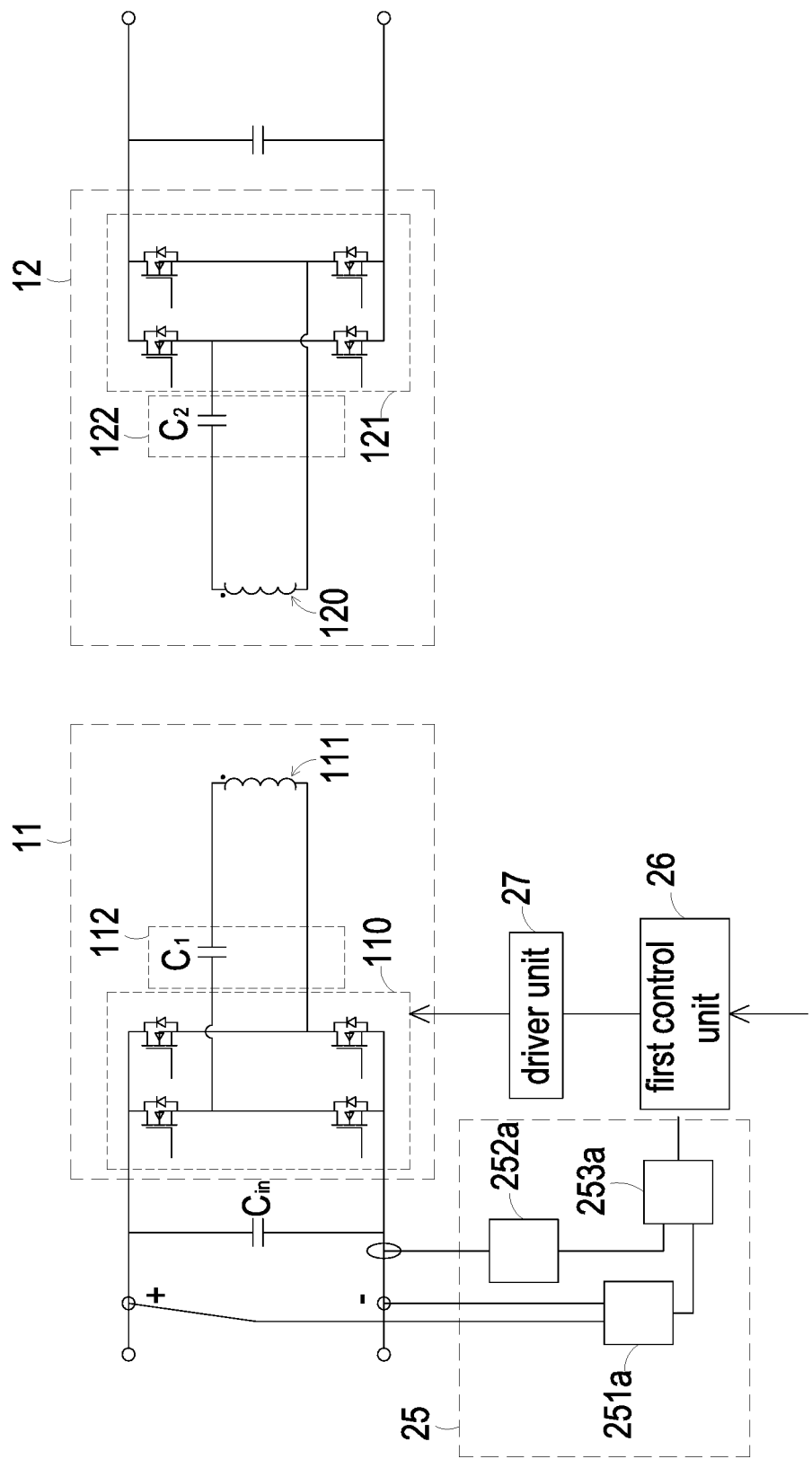
FIG. 5 is a schematic detailed circuit diagram illustrating the wireless power transmission device and the control circuit according to the first embodiment of the present disclosure.

FIG. 5 is a schematic detailed circuit diagram illustrating the wireless power transmission device and the control circuit according to the first embodiment of the present disclosure. The circuitry of the transmitter detecting unit 25 is similar to that of FIG. 4A, and is not redundantly described herein. The circuitry of the transmitter unit 11 is similar to that of FIG. 2B, and is not redundantly described herein. That is, the transmitter unit 11 comprises the inverter circuit 110, the compensation circuit 112 and the transmitter coil 111. The inverter circuit 110 is a full-bridge circuit comprising four switching devices. The driver unit 27 generates the driver signal according to the control signal, and drives the four switching devices respectively. The compensation circuit 112 comprises a capacitor $C_1$. The capacitor $C_1$ is serially connected between the inverter circuit 110 and the transmitter coil 111. In other words, the compensation circuit 112 is a serially-connected capacitor for compensating the reactive power. The circuitry of the receiver unit 12 is similar to that of FIG. 3B, and is not redundantly described herein. The receiver unit 12 comprises the receiver coil 120, the compensation circuit 122 and the rectifier circuit 121. The compensation circuit 122 comprises a capacitor $C_2$. The capacitor $C_2$ is serially connected between the receiver coil 120 and the rectifier circuit 121. In other words, the compensation circuit 122 is a serially-connected capacitor for compensating the reactive power. The rectifier circuit 121 is a full-bridge circuit comprising four switching devices. It is noted that the number of the switching devices of the inverter circuit 110 is determined according to the actual circuit topology, the switching devices are driven by the corresponding driver signal from the driver circuit 27.

Figure 6:
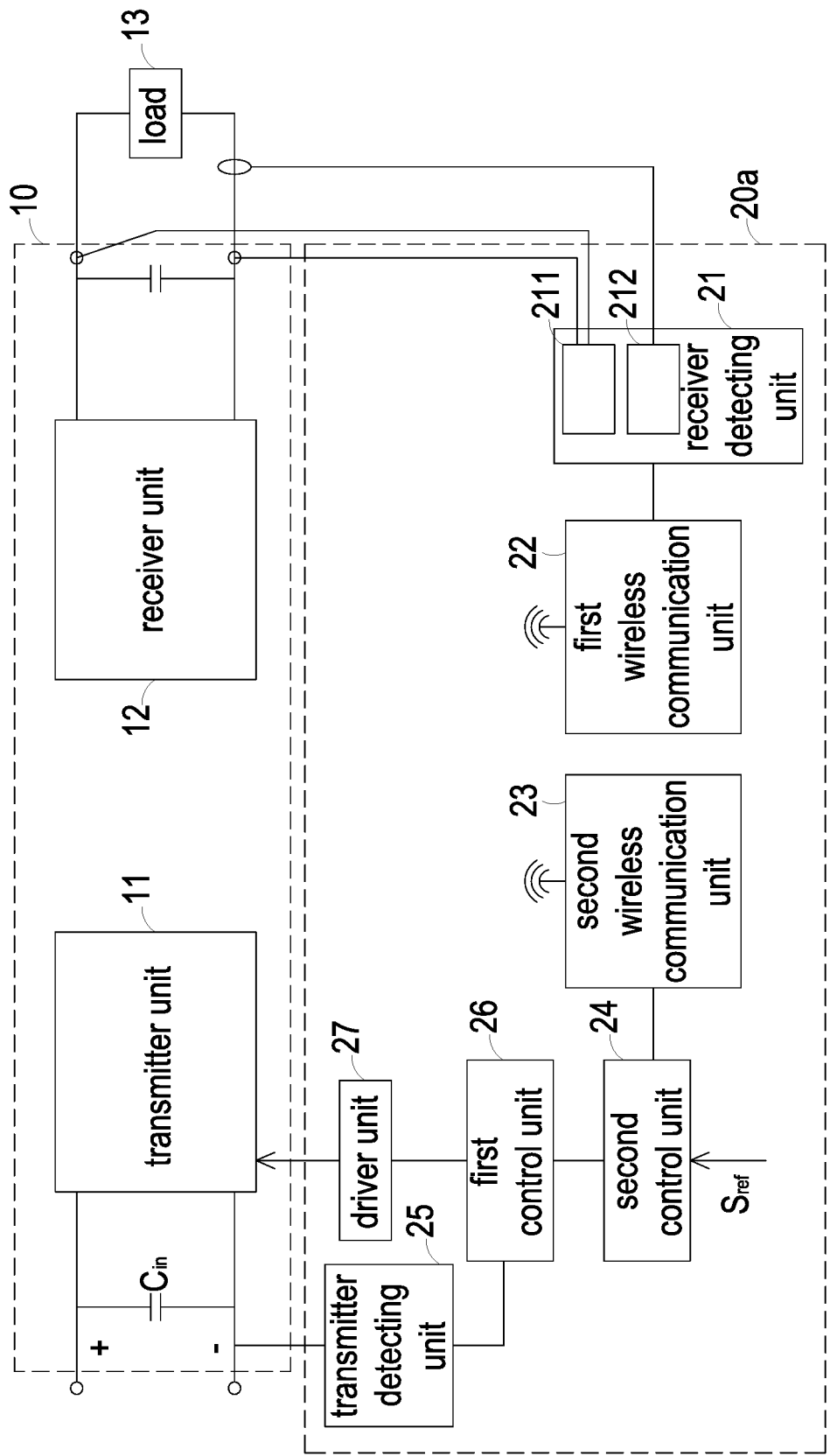
FIG. 6 is a schematic circuit diagram illustrating a wireless power transmission device and a control circuit for the wireless power transmission device according to a second embodiment of the present disclosure.

FIG. 6 is a schematic circuit diagram illustrating a wireless power transmission device and a control circuit for the wireless power transmission device according to a second embodiment of the present disclosure. Component parts and elements corresponding to those of the first embodiment are designated by identical numeral references, and detailed descriptions thereof are omitted. In comparison with the first embodiment, the control circuit 20a of this embodiment further comprises a receiver detecting unit 21, a first wireless communication unit 22, a second wireless communication unit 23 and a second control unit 24.

The receiver detecting unit 21 is connected with the output terminals of the receiver unit 12. The receiver detecting unit 21 is used for detecting the output of the receiver unit 12 and generating an output detecting signal.

The first wireless communication unit 22 is connected with the receiver detecting unit 21. According to the output detecting signal, the first wireless communication unit 22 generates a wireless signal. The second wireless communication unit 23 is in communication with the first wireless communication unit 22 for receiving the wireless signal from the first wireless communication unit 22. In addition, the wireless signal is transformed to the output detecting signal by the second wireless communication unit 23. For example, the first wireless communication unit 22 and the second wireless communication unit 23 are Bluetooth communication modules, Wi-Fi communication modules or radio frequency communication modules.

The second control unit 24 receives a reference signal Sref. Moreover, the second control unit 24 is connected with the second wireless communication unit 23 and the first control unit 26. The second control unit 24 receives the output detecting signal from the second wireless communication unit 23. According to the result of comparing the output detecting signal with the reference signal Sref, the second control unit 24 generates the reference input power signal to the first control unit 26. In an embodiment, the second control unit 24 and the first control unit 26 are included in the same control chip. Alternatively, the second control unit 24 and the first control unit 26 are included in two different control chips, respectively.

In an embodiment, the receiver detecting unit 21 comprises a receiver voltage detecting circuit 211 and a receiver current detecting circuit 212. The receiver voltage detecting circuit 211 is used for detecting the output voltage. The receiver current detecting circuit 212 is used for detecting the output current. According to the output voltage and the output current, the output power is obtained.

For example, the detected output of the receiver unit 12 contains an output current, an output voltage and/or an output power. The output power is calculated according to the output voltage and the output current. Correspondingly, the output detecting signal contains an output current signal, an output voltage signal and/or an output power signal.

In an embodiment, the output detecting signal contains the output voltage signal, and the reference signal Sref received by the second control unit 24 is a reference output voltage signal. The second control unit 24 generates the reference input power signal according to a result of comparing the output voltage signal with the reference output voltage signal. If the output voltage signal is higher than the reference output voltage signal, the reference input power signal is decreased. If the output voltage signal is lower than the reference output voltage signal, the reference input power signal is increased.

In an embodiment, the output detecting signal contains the output current signal, and the reference signal Sref received by the second control unit 24 is a reference output current signal. The second control unit 24 generates the reference input power signal according to a result of comparing the output current signal with the reference output current signal. If the output current signal is higher than the reference output current signal, the reference input power signal is decreased. If the output current signal is lower than the reference output current signal, the reference input power signal is increased.

In an embodiment, the output detecting signal contains the output power signal, and the reference signal Sref received by the second control unit 24 is a reference output power signal. The second control unit 24 generates the reference input power signal according to a result of comparing the output power signal with the reference output power signal. If the output power signal is higher than the reference output power signal, the reference input power signal is decreased. If the output power signal is lower than the reference output power signal, the reference input power signal is increased.

Regardless of whether the detected output of receiver unit 12 contains the output current, the output voltage or the output power, the circuitry is not changed.

Figure 7:
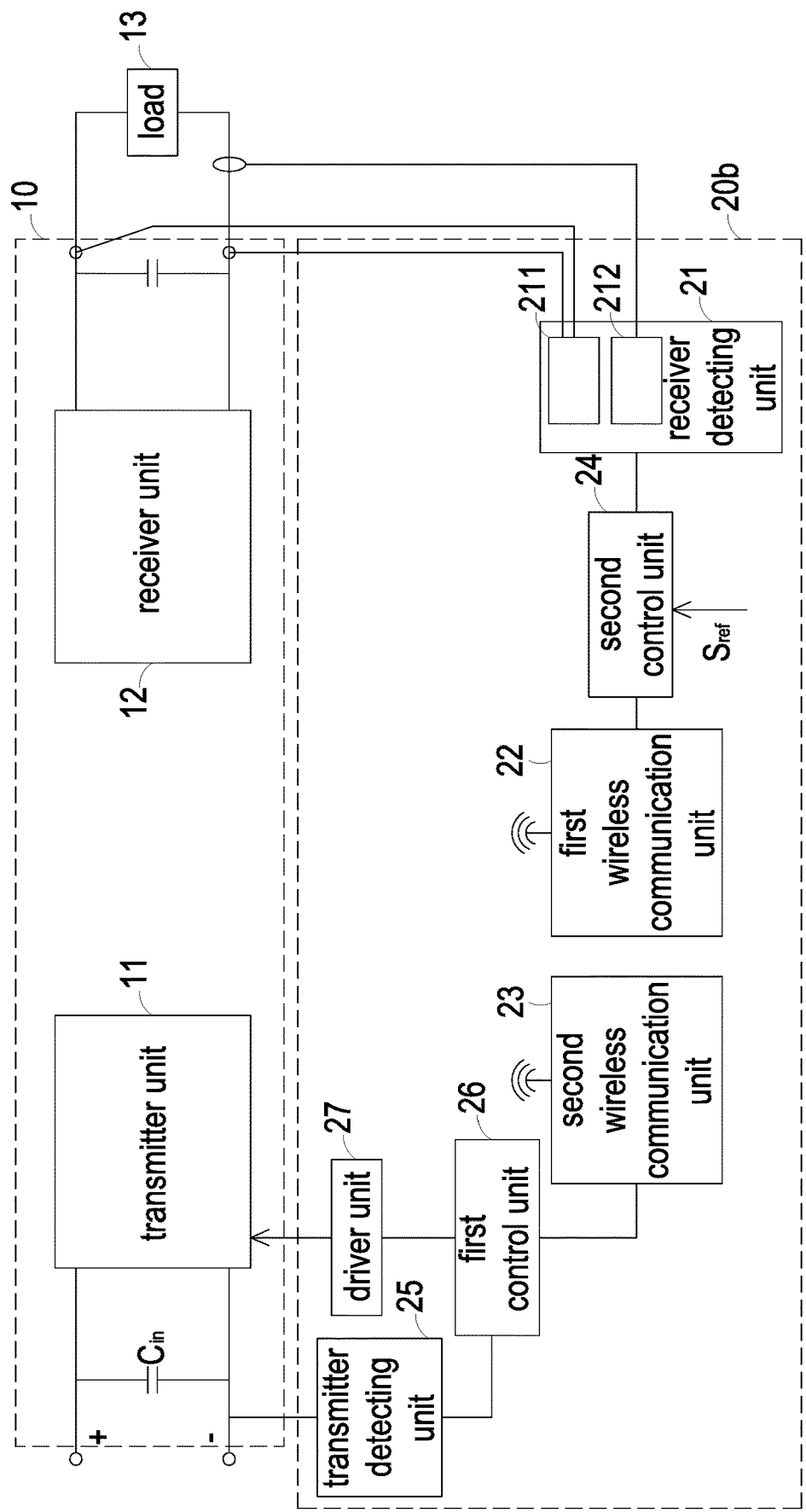
FIG. 7 is a schematic circuit diagram illustrating a wireless power transmission device and a control circuit for the wireless power transmission device according to a third embodiment of the present disclosure.

FIG. 7 is a schematic circuit diagram illustrating a wireless power transmission device and a control circuit for the wireless power transmission device according to a third embodiment of the present disclosure. Component parts and elements corresponding to those of the second embodiment are designated by identical numeral references, and detailed descriptions thereof are omitted. In comparison with the second embodiment, the control circuit 20*b* of this embodiment is distinguished. In this embodiment, the second control unit 24 is connected between the receiver detecting unit 21 and the first wireless communication unit 22, and the second wireless communication unit 23 is connected with the first control unit 26.

The second control unit 24 receives a reference signal Sref. Moreover, the second control unit 24 is connected with the receiver detecting unit 21 to receive the output detecting signal from the receiver detecting unit 21. According to the result of comparing the output detecting signal with the reference signal Sref, the second control unit 24 generates the reference input power signal to the first wireless communication unit 22.

The first wireless communication unit 22 is connected with the second control unit 24. According to the reference input power signal, the first wireless communication unit 22 generates a wireless signal. The second wireless communication unit 23 is in communication with the first wireless communication unit 22 for receiving the wireless signal from the first wireless communication unit 22. In addition, the wireless signal is transformed to the reference input power signal by the second wireless communication unit 23. Then, the reference input power signal is transmitted to the first control unit 26.

Figure 8:
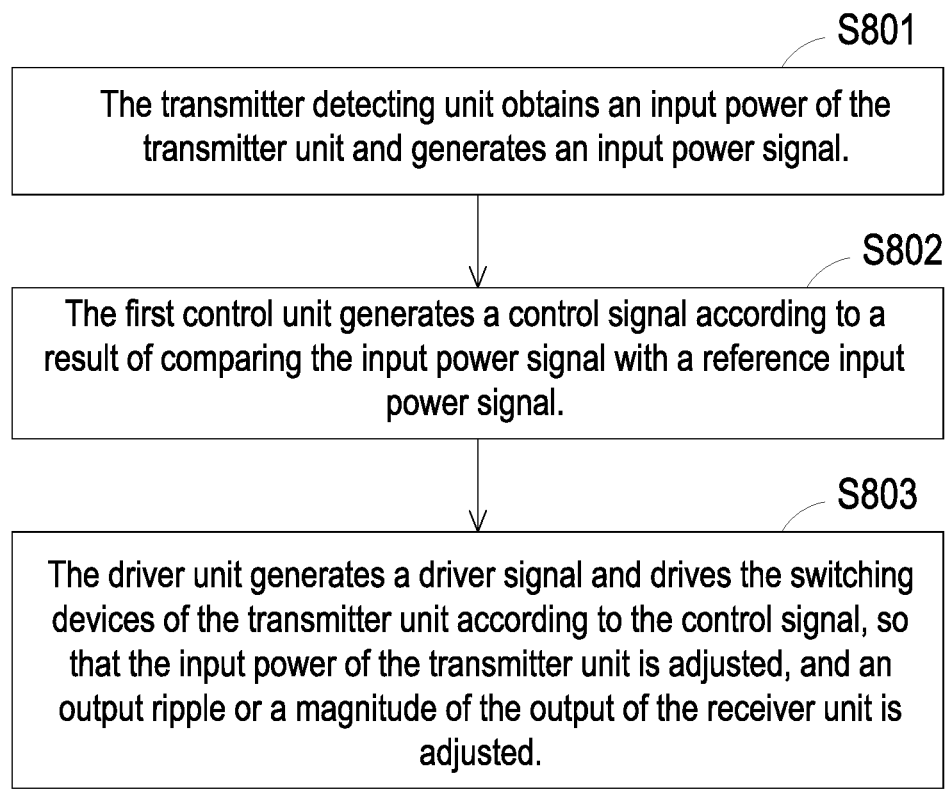
FIG. 8 is a flowchart illustrating a control method for a wireless power transmission device according to the first embodiment of the present disclosure.

FIG. 8 is a flowchart illustrating a control method for a wireless power transmission device according to the first embodiment of the present disclosure. The control method is applied to the wireless power transmission device of FIG. 1. The control method comprises the following steps.

Firstly, the transmitter detecting unit 25 obtains an input power of the transmitter unit 11 and generates an input power signal (Step S801). Then, the first control unit 26 generates a control signal according to a result of comparing the input power signal with a reference input power signal (Step S802). Then, the driver unit 27 generates a driver signal and drives the switching devices of the transmitter unit 11 according to the control signal. Consequently, the input power of the transmitter unit 11 is adjusted, and an output ripple or a magnitude of the output of the receiver unit 12 is adjusted (Step S803).

Figure 9:
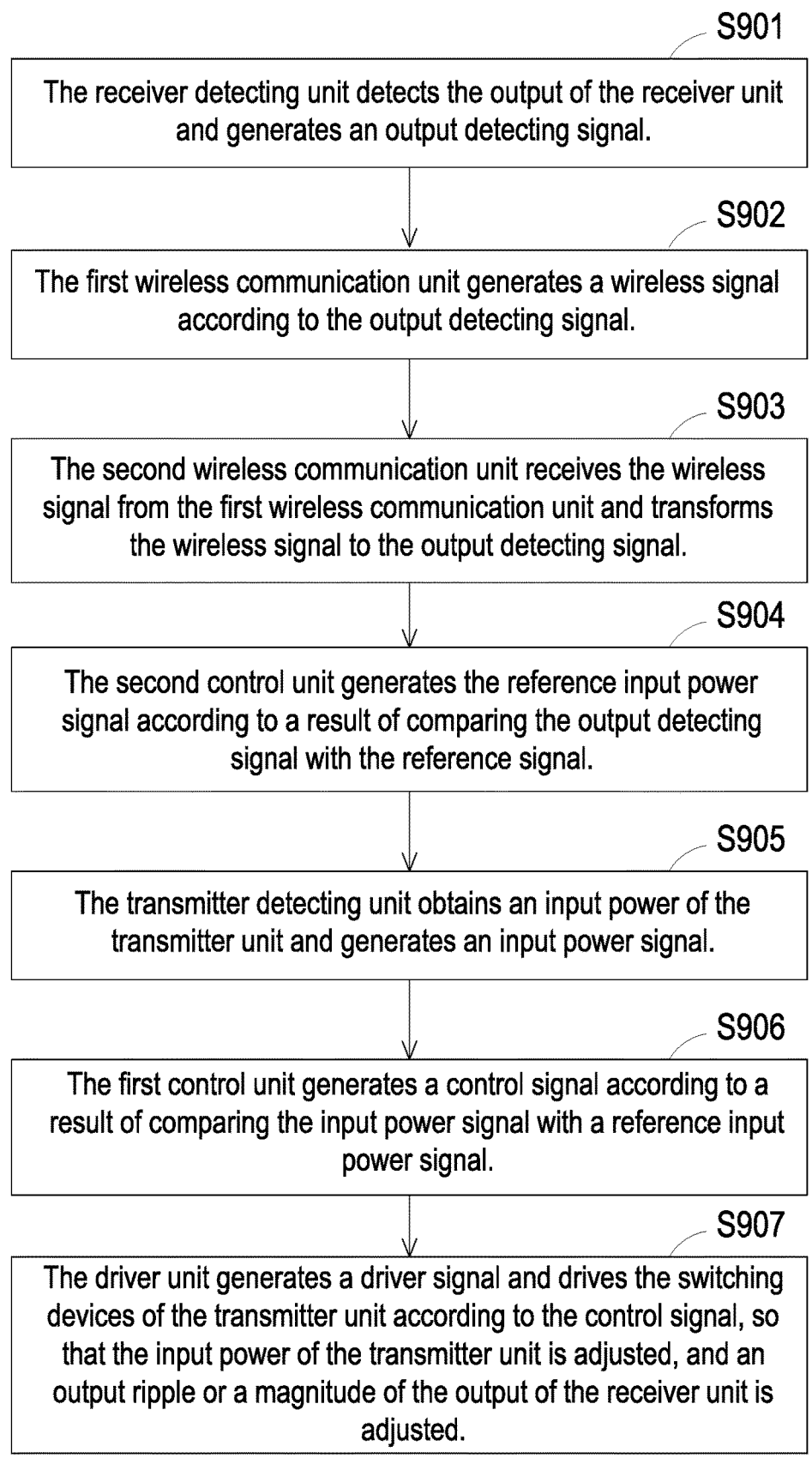
FIG. 9 is a flowchart illustrating a control method for a wireless power transmission device according to the second embodiment of the present disclosure.

FIG. 9 is a flowchart illustrating a control method for a wireless power transmission device according to the second embodiment of the present disclosure. The control method is applied to the wireless power transmission device of FIG. 6. The control method comprises the following steps.

(a), the receiver detecting unit 21 detects the output of the receiver unit 12 and generates an output detecting signal (Step S901). (b), the first wireless communication unit 22 generates a wireless signal according to the output detecting signal (Step S902). (c), the second wireless communication unit 23 receives the wireless signal from the first wireless communication unit 22 and transforms the wireless signal to the output detecting signal (Step S903). (d), the second control unit 24 generates the reference input power signal according to a result of comparing the output detecting signal with the reference signal (Step S904). (e), the transmitter detecting unit 25 obtains an input power of the transmitter unit 11 and generates an input power signal (Step S905). (f), the first control unit 26 generates a control signal according to a result of comparing the input power signal with a reference input power signal (Step S906). (g), the driver unit 27 generates a driver signal and drives the switching devices of the transmitter unit 11 according to the control signal. Consequently, the input power of the transmitter unit 11 is adjusted, and an output ripple or a magnitude of the output of the receiver unit 12 is adjusted (Step S907).

Figure 10:
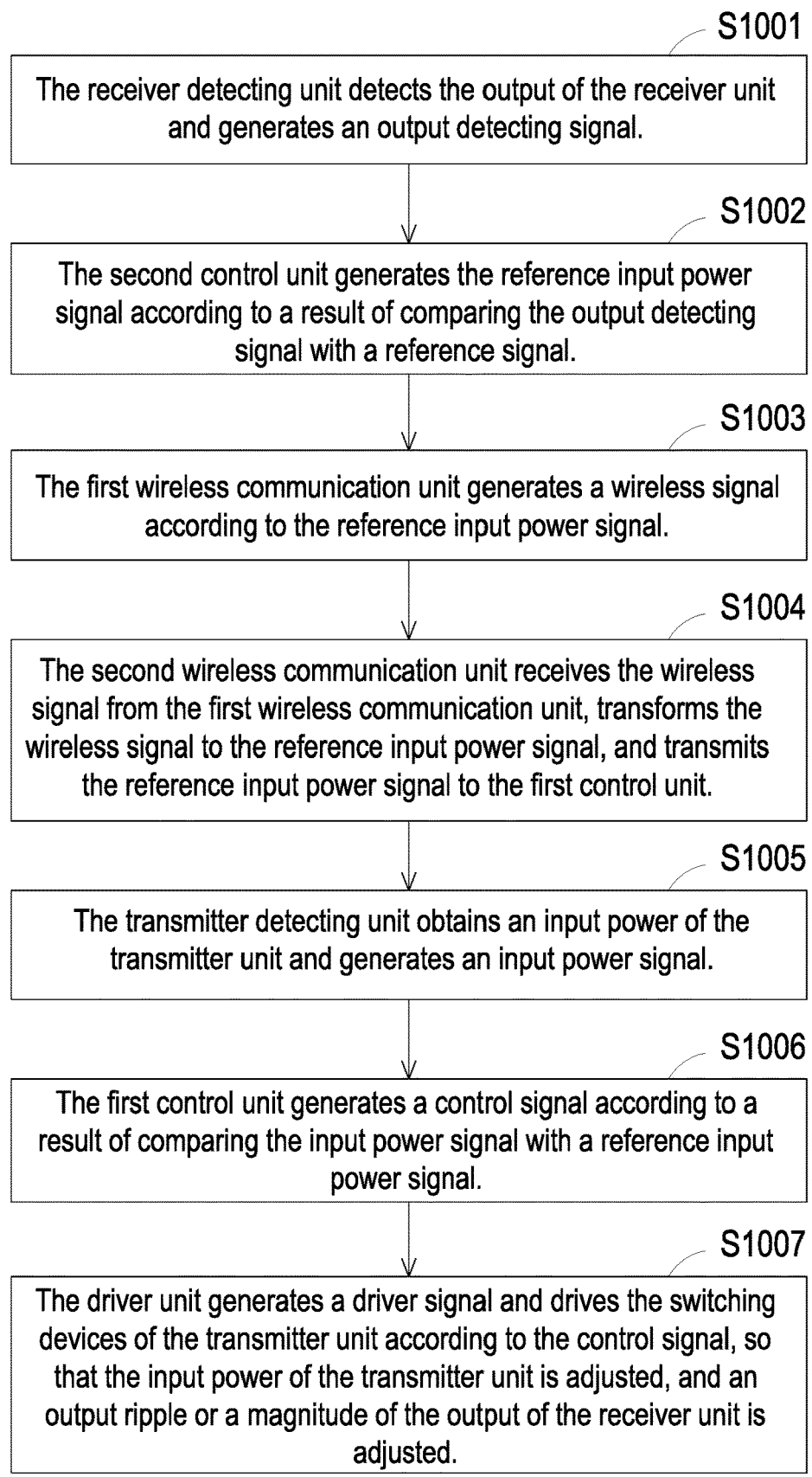
FIG. 10 is a flowchart illustrating a control method for a wireless power transmission device according to the third embodiment of the present disclosure.

FIG. 10 is a flowchart illustrating a control method for a wireless power transmission device according to the third embodiment of the present disclosure. The control method is applied to the wireless power transmission device of FIG. 7. The control method comprises the following steps.

(a), the receiver detecting unit 21 detects the output of the receiver unit 12 and generates an output detecting signal (Step S1001). (b), the second control unit 24 generates the reference input power signal according to a result of comparing the output detecting signal with a reference signal Sref (Step S1002). (c), the first wireless communication unit 22 generates a wireless signal according to the reference input power signal (Step S1003). (d), the second wireless communication unit 23 receives the wireless signal from the first wireless communication unit 22, transforms the wireless signal to the reference input power signal, and transmits the reference input power signal to the first control unit 26 (Step S1004). (e), the transmitter detecting unit 25 obtains an input power of the transmitter unit 11 and generates an input power signal (Step S1005). (f), the first control unit 26 generates a control signal according to a result of comparing the input power signal with a reference input power signal (Step S1006). (g), the driver unit 27 generates a driver signal and drives the switching devices of the transmitter unit 11 according to the control signal. Consequently, the input power of the transmitter unit 11 is adjusted, and an output ripple or a magnitude of the output of the receiver unit 12 is adjusted (Step S1007).

From the above descriptions, the present disclosure provides a control circuit and a control method for a wireless power transmission device. The wireless power transmission device includes a transmitter unit and a receiver unit. The control circuit includes a transmitter detecting unit, a first control unit and a driver unit. The transmitter detecting unit obtains an input power of the transmitter unit and generates an input power signal. The first control unit generates a control signal according to a result of comparing the input power signal with a reference input power signal. The driver unit generates a driver signal and drives the switching devices of the transmitter unit according to the control signal. Consequently, the input power of the transmitter unit is adjusted. Generally, the input power of the transmitter unit is related to the output ripple or the magnitude of the output of the receiver unit. Consequently, as the input power of the transmitter unit is adjusted, the output ripple or the magnitude of the output of the receiver unit is correspondingly controlled. In comparison with the conventional technology, the technology of the present disclosure is more advantageous. For example, the control circuit and the control method of the present disclosure are effective to control the output ripple or the magnitude of the output of the receiver unit quickly. Moreover, in case that the ripple contained in the input power has a higher frequency than the frequency of close-loop control through wireless communication, the input power can be directly adjusted according to the control circuit and the control method of the present disclosure. Consequently, the output ripple is reduced or eliminated. In other words, the control circuit and the control method of the present disclosure are capable of directly adjusting the input power without the need of additionally installing a capacitor, an inductor and/or an adjusting circuit. Consequently, the output ripple is reduced or eliminated. In other words, the volume, power loss and efficiency of the wireless power transmission device are not adversely affected.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control circuit for a wireless power transmission device, the wireless power transmission device comprising an input capacitor, a transmitter unit and a receiver unit, the transmitter unit comprising a transmitter coil and an inverter circuit for receiving an input DC power, output terminals of the inverter circuit being connected with the transmitter coil, the input DC power being converted into an AC power by the inverter circuit, the AC power being transmitted from the transmitter coil, the input capacitor being connected with input terminals of the inverter circuit in parallel, the control circuit comprising:
    a transmitter detecting unit for obtaining an input power of the transmitter unit and generating an input power signal;
    a first control unit for generating a control signal according to a result of comparing the input power signal with a reference input power signal; and
    a driver unit for driving switching devices of the transmitter unit according to the control signal, thereby adjusting the input power of the transmitter unit, wherein at least one of an output ripple and a magnitude of an output of the receiver unit, is adjusted through adjusting the input power of the transmitter unit,
    wherein the transmitter detecting unit comprises;
        a voltage detecting circuit connected with input terminals of the input capacitor, and detecting a voltage at the input terminals of the input capacitor;
        a current detecting circuit connected with the input terminals of the inverter circuit, and detecting a current to the input terminals of the inverter circuit;
        a low pass filter connected with the current detecting circuit, wherein the current into the input terminals of the inverter circuit is filtered by the low pass filter; and
        a multiplier connected with the voltage detecting circuit and the low pass filter, wherein the multiplier obtains the input power of the transmitter unit according to the voltage at the input terminals of the input capacitor and the filtered current from the low pass filter and generates the input power signal according to the input power.

2. The control circuit according to claim 1, further comprising:
    a receiver detecting unit for detecting the output of the receiver unit and generating an output detecting signal;
    a first wireless communication unit for generating a wireless signal according to the output detecting signal;
    a second wireless communication unit in wireless communication with the first wireless communication unit for receiving the wireless signal from the first wireless communication unit and transforming the wireless signal to the output detecting signal; and
    a second control unit for generating the reference input power signal according to a result of comparing the output detecting signal with a reference signal;
    wherein the first wireless communication unit and the second wireless communication unit are Bluetooth communication modules, Wi-Fi communication modules or radio frequency communication modules.

3. The control circuit according to claim 1, further comprising:
    a receiver detecting unit for detecting the output of the receiver unit and generating an output detecting signal;
    a second control unit for generating the reference input power signal according to a result of comparing the output detecting signal with a reference signal;
    a first wireless communication unit for generating a wireless signal according to the reference input power signal; and
    a second wireless communication unit in wireless communication with the first wireless communication unit for receiving the wireless signal from the first wireless communication unit and transforming the wireless signal to the reference input power signal;
    wherein the first wireless communication unit and the second wireless communication unit are Bluetooth communication modules, Wi-Fi communication modules or radio frequency communication modules.

4. The control circuit according to claim 1, wherein the receiver unit comprises:
    a receiver coil; and
    a rectifier circuit, wherein input terminals of the rectifier circuit are connected with the receiver coil,
    wherein after the AC power from the transmitter coil is received by the receiver coil, the AC power is transmitted to the rectifier and the AC power is converted into an output DC power by the rectifier circuit.

5. The control circuit according to claim 1, wherein if the input power signal is higher than the reference input power signal, the driver unit drives the switching devices according to the control signal, so that the input power is decreased, wherein if the input power signal is lower than the reference input power signal, the driver unit drives the switching devices according to the control signal, so that the input power is increased.

6. The control circuit according to claim 1, wherein if the input power signal is higher than the reference input power signal, the first control unit generates the control signal with an increased switching frequency, a decreased duty cycle or an increased shifted phase angle, wherein if the input power signal is lower than the reference input power signal, the first control unit generates the control signal with a decreased switching frequency, an increased duty cycle or a decreased shifted phase angle.

7. The control circuit according to claim 2, wherein the output of the receiver unit contains an output current, an output voltage and/or an output power, and the output detecting signal contains an output current signal, an output voltage signal and/or an output power signal.

8. The control circuit according to claim 7, wherein the receiver detecting unit comprises:
a receiver voltage detecting circuit for detecting the output voltage and generating the output voltage signal; and
a receiver current detecting circuit for detecting the output current and generating the output current signal.

9. The control circuit according to claim 7, wherein the reference signal is a reference output voltage signal, and the second control unit generates the reference input power signal according to a result of comparing the output voltage signal with the reference output voltage signal, wherein if the output voltage signal is higher than the reference output voltage signal, the reference input power signal is decreased, wherein if the output voltage signal is lower than the reference output voltage signal, the reference input power signal is increased.

10. The control circuit according to claim 7, wherein the reference signal is a reference output current signal, and the second control unit generates the reference input power signal according to a result of comparing the output current signal with the reference output current signal, wherein if the output current signal is higher than the reference output current signal, the reference input power signal is decreased, wherein if the output current signal is lower than the reference output current signal, the reference input power signal is increased.

11. The control circuit according to claim 7, wherein the reference signal is a reference output power signal, and the second control unit generates the reference input power signal according to a result of comparing the output power signal with the reference output power signal, wherein if the output power signal is higher than the reference output power signal, the reference input power signal is decreased, wherein if the output power signal is lower than the reference output power signal, the reference input power signal is increased.

12. The control circuit according to claim 3, wherein the output of the receiver unit contains an output current, an output voltage and/or an output power, and the output detecting signal contains an output current signal, an output voltage signal and/or an output power signal.

13. The control circuit according to claim 12, wherein the reference signal is a reference output voltage signal, and the second control unit generates the reference input power signal according to a result of comparing the output voltage signal with the reference output voltage signal, wherein if the output voltage signal is higher than the reference output voltage signal, the reference input power signal is decreased, wherein if the output voltage signal is lower than the reference output voltage signal, t the reference input power signal is increased.

14. The control circuit according to claim 12, wherein the reference signal is a reference output current signal, and the second control unit generates the reference input power signal according to a result of comparing the output current signal with the reference output current signal, wherein if the output current signal is higher than the reference output current signal, the reference input power signal is decreased, wherein if the output current signal is lower than the reference output current signal, the reference input power signal is increased.

15. The control circuit according to claim 12, wherein the reference signal is a reference output power signal, and the second control unit generates the reference input power signal according to a result of comparing the output power signal with the reference output power signal, wherein if the output power signal is higher than the reference output power signal, the reference input power signal is decreased, wherein if the output power signal is lower than the reference output power signal, the reference input power signal is increased.

16. The control circuit according to claim 1, wherein the output ripple contains an output voltage ripple, an output current ripple or an output power ripple.

17. A control method for a wireless power transmission device, the wireless power transmission device comprising an input capacitor, a transmitter unit and a receiver unit, the transmitter unit comprising an inverter circuit, the input capacitor being connected with input terminals of the inverter circuit, the control method comprising steps of:
(a) detecting a voltage at input terminals of the input capacitor and a current to the input terminals of the inverter circuit, filtering the current to the input terminals of the inverter circuit by a low pass filter, obtaining the input power of the transmitter unit according to the voltage at the input terminals of the input capacitor and the filtered current from the low pass filter, and generating the input power signal according to the input power by a multiplier;
(b) generating a control signal according to a result of comparing the input power signal with a reference input power signal by a first control unit; and
(c) driving switching devices of the transmitter unit according to the control signal by a driver unit, thereby adjusting the input power of the transmitter unit, and adjusting at least one of an output ripple and a magnitude of an output of the receiver unit through adjusting the input power of the transmitter unit.

18. The control method according to claim 17, wherein before the step (a), the control method further comprises steps of:
detecting the output of the receiver unit and generating an output detecting signal by a receiver detecting unit;
generating a wireless signal according to the output detecting signal by a first wireless communication unit;
receiving the wireless signal and transforming the wireless signal to the output detecting signal by a second wireless communication unit; and
generating the reference input power signal according to a result of comparing the output detecting signal with a reference signal by a second control unit.

19. The control method according to claim 17, wherein before the step (a), the control method further comprises steps of:
 detecting the output of the receiver unit and generating an output detecting signal by a receiver detecting unit;
 generating the reference input power signal according to a result of comparing the output detecting signal with a reference signal by a second control unit;
 generating a wireless signal according to the reference input power signal by a first wireless communication unit; and
 receiving the wireless signal and transforming the wireless signal to the reference input power signal by a second wireless communication unit.

20. The control method according to claim 17, wherein if the input power signal is higher than the reference input power signal in the step (b) and the step (c), the switching devices of the transmitter unit is driven according to the control signal, so that the input power is decreased, wherein if the input power signal is lower than the reference input power signal in the step (b) and the step (c), the switching devices of the transmitter unit is driven according to the control signal, so that the input power is increased.

21. The control method according to claim 17, wherein if the input power signal is higher than the reference input power signal, the first control unit generates the control signal with an increased switching frequency, a decreased duty cycle or an increased shifted phase angle, wherein if the input power signal is lower than the reference input power signal, the first control unit generates the control signal with a decreased switching frequency, an increased duty cycle or a decreased shifted phase angle.

22. The control method according to claim 18 wherein the output of the receiver unit contains an output current, an output voltage and/or an output power, and the output detecting signal contains an output current signal, an output voltage signal and/or an output power signal.

23. The control method according to claim 22, wherein the reference signal is a reference output voltage signal, and the reference input power signal is generated according to a result of comparing the output voltage signal with the reference output voltage signal by the second control unit, wherein if the output voltage signal is higher than the reference output voltage signal, the reference input power signal is decreased, wherein if the output voltage signal is lower than the reference output voltage signal, the reference input power signal is increased.

24. The control method according to claim 22, wherein the reference signal is a reference output current signal, and the reference input power signal is generated according to a result of comparing the output current signal with the reference output current signal by the second control unit, wherein if the output current signal is higher than the reference output current signal, the reference input power signal is decreased, wherein if the output current signal is lower than the reference output current signal, the reference input power signal is increased.

25. The control method according to claim 22, wherein the reference signal is a reference output power signal, and the reference input power signal is generated according to a result of comparing the output power signal with the reference output power signal by the second control unit, wherein if the output power signal is higher than the reference output power signal, the reference input power signal is decreased, wherein if the output power signal is lower than the reference output power signal, the reference input power signal is increased.

26. The control method according to claim 19, wherein the output of the receiver unit contains an output current, an output voltage and/or an output power, and the output detecting signal contains an output current signal, an output voltage signal and/or an output power signal.

27. The control method according to claim 26, wherein the reference signal is a reference output voltage signal, and the reference input power signal is generated according to a result of comparing the output voltage signal with the reference output voltage signal by the second control unit, wherein if the output voltage signal is higher than the reference output voltage signal, the reference input power signal is decreased, wherein if the output voltage signal is lower than the reference output voltage signal, the reference input power signal is increased.

28. The control method according to claim 26, wherein the reference signal is a reference output current signal, and the reference input power signal is generated according to a result of comparing the output current signal with the reference output current signal by the second control unit, wherein if the output current signal is higher than the reference output current signal, the reference input power signal is decreased, wherein if the output current signal is lower than the reference output current signal, the reference input power signal is increased.

29. The control method according to claim 26, wherein the reference signal is a reference output power signal, and the reference input power signal is generated according to a result of comparing the output power signal with the reference output power signal by the second control unit, wherein if the output power signal is higher than the reference output power signal, the reference input power signal is decreased, wherein if the output power signal is lower than the reference output power signal, the reference input power signal is increased.

30. The control method according to claim 17, wherein the output ripple contains an output voltage ripple, an output current ripple or an output power ripple.

31. A control circuit for a wireless power transmission device, the wireless power transmission device comprising an input capacitor, a transmitter unit and a receiver unit, the transmitter unit comprising a transmitter coil and an inverter circuit for receiving an input DC power, output terminals of the inverter circuit being connected with the transmitter coil, the input DC power being converted into an AC power by the inverter circuit, the AC power being transmitted from the transmitter coil, the input capacitor being connected with input terminals of the inverter circuit in parallel, the control circuit comprising:
 a transmitter detecting unit for obtaining an input power of the transmitter unit and generating an input power signal;
 a first control unit for generating a control signal according to a result of comparing the input power signal with a reference input power signal; and
 a driver unit for driving switching devices of the transmitter unit according to the control signal, thereby adjusting the input power of the transmitter unit, wherein at least one of an output ripple and a magnitude of an output of the receiver unit is adjusted through adjusting the input power of the transmitter unit,
 wherein the transmitter detecting unit comprises:
  a voltage detecting circuit connected with input terminals of the input capacitor, and detecting a voltage at the input terminals of the input capacitor;

a current detecting circuit connected with the input terminals of the input capacitor, and detecting a current to the input terminals of the input capacitor; and a multiplier connected with the voltage detecting circuit and the current detecting circuit, wherein the multiplier obtains the input power of the transmitter unit according to the voltage at the input terminals of the input capacitor and the current to the input terminals of the input capacitor and generates the input power signal according to the input power.

32. A control circuit for a wireless power transmission device, the wireless power transmission device comprising a transmitter unit and a receiver unit, the transmitter unit comprising a transmitter coil and an inverter circuit for receiving an input DC power, output terminals of the inverter circuit being connected with the transmitter coil, the input DC power being converted into an AC power by the inverter circuit, the AC power being transmitted from the transmitter coil, the control circuit comprising:

a transmitter detecting unit for obtaining an input power of the transmitter unit and generating an input power signal;

a first control unit for generating a control signal according to a result of comparing the input power signal with a reference input power signal; and a driver unit for driving switching devices of the transmitter unit according to the control signal, thereby adjusting the input power of the transmitter unit, wherein at least one of an output ripple and a magnitude of an output of the receiver unit is adjusted through adjusting the input power of the transmitter unit, wherein the transmitter detecting unit comprises:

a voltage detecting circuit connected with the output terminals of the inverter circuit, and detecting a voltage of the AC power;

a current detecting circuit connected with the output terminals of the inverter circuit, and detecting a current of the AC power;

a phase detector connected with the voltage detecting circuit and the current detecting circuit, wherein the phase detector obtains a phase difference between the voltage of the AC power and the current of the AC power; and a calculator connected with the voltage detecting circuit, the current detecting circuit and the phase detector, wherein the calculator obtains the input power of the transmitter unit according to the voltage of the AC power, the current of the AC power and the phase difference and generates the input power signal according to the input power.

33. A control method for a wireless power transmission device, the wireless power transmission device comprising an input capacitor, a transmitter unit and a receiver unit, the transmitter unit comprising an inverter circuit, the input capacitor being connected with input terminals of the inverter circuit, the control method comprising steps of:

(a) detecting a voltage at input terminals of the input capacitor and a current to the input terminals of the input capacitor, obtaining the input power of the transmitter unit according to the voltage at the input terminals of the input capacitor and the current to the input terminals of the input capacitor, and generating the input power signal according to the input power by a multiplier;

(b) generating a control signal according to a result of comparing the input power signal with a reference input power signal by a first control unit; and (c) driving switching devices of the transmitter unit according to the control signal by a driver unit, thereby adjusting the input power of the transmitter unit, and adjusting at least one of an output ripple and a magnitude of an output of the receiver unit through adjusting the input power of the transmitter unit.

34. A control method for a wireless power transmission device, the wireless power transmission device comprising a transmitter unit and a receiver unit, the transmitter unit comprising an inverter circuit for converting an input DC power into an AC power, the control method comprising steps of:

(a) detecting a voltage of the AC power and a current of the AC power, obtaining a phase difference between the voltage of the AC power and the current of the AC power by a phase detector, obtaining the input power of the transmitter unit according to the voltage of the AC power, the current of the AC power and the phase difference, and generating the input power signal according to the input power by a calculator;

(b) generating a control signal according to a result of comparing the input power signal with a reference input power signal by a first control unit; and (c) driving switching devices of the transmitter unit according to the control signal by a driver unit, thereby adjusting the input power of the transmitter unit, and adjusting at least one of an output ripple and a magnitude of an output of the receiver unit through adjusting the input power of the transmitter unit.

* * * * *